United States Patent
Stewart et al.

(10) Patent No.: US 7,558,734 B1
(45) Date of Patent: *Jul. 7, 2009

(54) USING WEB FAQ DATA FOR CREATING SELF-SERVICE SPEECH APPLICATIONS

(75) Inventors: Osamuyimen T. Stewart, Piscataway, NJ (US); David M. Lubensky, Brookfield, CT (US); Ea-Ee Jan, Ardsley, NY (US); Xiang Li, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/271,912

(22) Filed: Nov. 16, 2008

Related U.S. Application Data

(63) Continuation of application No. 12/037,996, filed on Feb. 27, 2008, now Pat. No. 7,467,090.

(51) Int. Cl.
*G10L 21/00* (2006.01)
(52) U.S. Cl. .............. 704/270; 704/270.1; 704/275; 379/88.01
(58) Field of Classification Search ............. 704/270, 704/270.1, 275; 379/88.01
See application file for complete search history.

(56) References Cited

U.S. PATENT DOCUMENTS

| | | | |
|---|---|---|---|
| 6,658,386 B2 * | 12/2003 | Kemble et al. | 704/270 |
| 6,983,044 B2 | 1/2006 | Clifton et al. | |
| 7,197,460 B1 | 3/2007 | Gupta et al. | |
| 7,373,300 B1 * | 5/2008 | Bangalore et al. | 704/270.1 |
| 7,451,089 B1 * | 11/2008 | Gupta et al. | 704/270.1 |
| 2003/0002651 A1 | 1/2003 | Shires | |
| 2005/0025293 A1 | 2/2005 | Romeo et al. | |
| 2005/0216358 A1 | 9/2005 | Fichtner et al. | |
| 2005/0256716 A1 * | 11/2005 | Bangalore et al. | 704/260 |
| 2006/0069570 A1 * | 3/2006 | Allison et al. | 704/270 |

OTHER PUBLICATIONS

Feng et al. "Webtalk: Mining websites for interactively answering questions". In Proceedings of the 9th European Conference on Speech Communication and Technology, Sep. 2005, pp. 2485-2488.*
US 7,236,962, 06/2007, Fratkina et al. (withdrawn)

* cited by examiner

*Primary Examiner*—James S Wozniak
(74) *Attorney, Agent, or Firm*—MaxValueIP, LLC

(57) ABSTRACT

In one example, this invention presents a method of providing the same self-service content that is available on the web interface to users contacting by telephone, knowing that the web and telephone are fundamentally different user interfaces. In one embodiment, this patent seeks to protect the general idea of how to playback web data in real-time to the user over the speech interface. For this purpose, a method is presented comprising of the general steps through which the web data is initially sent to an automatic transformation module. Then, that transformation module refines or re-structures the web data to make it suitable for the speech interface. The algorithm in the module is predicated on the user interface principles of cognitive complexity and limitations on short term memory based on which FAQ types are classified into one of the following four classes: simple, medium, complex, and complex-complex.

1 Claim, 3 Drawing Sheets

PRIOR ART

USING WEB FAQ DATA FOR CREATING SELF-SERVICE SPEECH APPLICATIONS

This is a Cont. of another Accelerated Exam. application Ser. No. 12/037,996, filed Feb. 27, 2008, to issued in Dec. 16, 2008, now U.S. Pat. No. 7,467,090, with the same title, inventors, and assignee, IBM.

BACKGROUND OF THE INVENTION

Frequently asked questions (FAQs) sections exist in abundance on the web and provide a good source of information that, in speech applications, can be automatically played back to the user in real-time. Regarding the automatic playback of online content or web FAQs to users over a telephone-based speech application, this is an approach that the industry is just now beginning to explore. The current popular approach is simply to fetch the FAQ or online content and play it back to the user, "as-is," without any real-time transformation of the information to suit the voice user interface in the speech interface.

However, it is misleading to assume a direct transfer of web data to the speech interface. It is due to the fact that the web and the telephone channels represent fundamentally different user interfaces resulting in several usability problems. For example, many FAQs contain graphical content and so, simply fetching the FAQs from the web encounters the problem of how to translate graphical content into text. Also, for the FAQs that only contain text, these are written in a textual or visual interface and as a result most instructions have multiple actions or conjunctions. For example, "hold down the action key and then page down" is written as one step but in reality it involves two actions (a) hold down the action key, and (b) page down. The user is able to easily parse multiple actions or conjunctions in the textual or visual interface. However, the same is not true when it is played back in a speech application because of the impact on user's short term memory. In addition, most of the FAQs contain lengthy list of instructions which make it difficult to playback on the telephone interface without excessively tasking the short term memory or which make it difficult to allow the user to be able to apply the instructions for actually resolving their problem. Furthermore, FAQs do not usually have specific or standard formats and this makes it difficult to devise a systematic way to playback FAQs across different clients or domains.

FAQs have not been successfully implemented for automatic playback to users in speech applications. We want a systematic automated process or algorithm to transform the data from a tactile web-oriented interface to the suitable auditory or multimodal interface for providing self service to users via speech applications.

SUMMARY OF THE INVENTION

One example of type of issues addressed by this invention is the general process or understanding of how to offer the same self service content that is available on the web interface to users seeking the same information over the telephone, bearing in mind that the web and telephone are fundamentally different user interfaces. In one embodiment, this patent seeks to protect the general process of how to take web data and play it back in real-time to the user over the speech interface. We present an example of a method comprising (in one embodiment) of the general steps whereby the web data is initially sent to an automatic transformation module. Then, that transformation module refines or re-structures the web data to make it suitable for the speech interface. The algorithm in the module is predicated on the user interface principles of cognitive complexity and limitations on short term memory based on which FAQ types are classified into one of the following four classes: simple, medium, complex, and complex-complex.

DETAILED DESCRIPTION OF THE PREFERRED EMBODIMENTS

Figure 1:
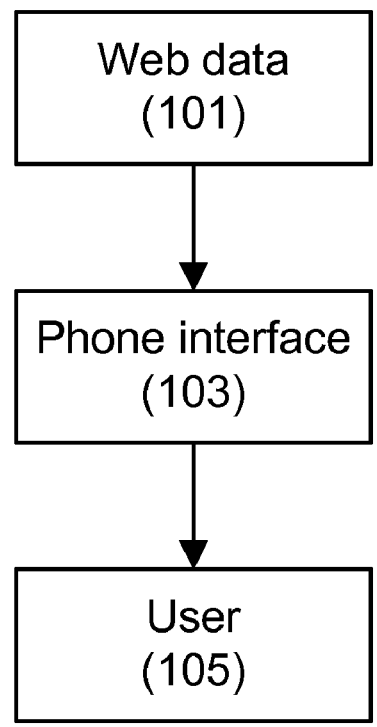
FIG. 1 is a schematic diagram of showing how the web data are entering phone interfaces in the prior art.
Figure 2:
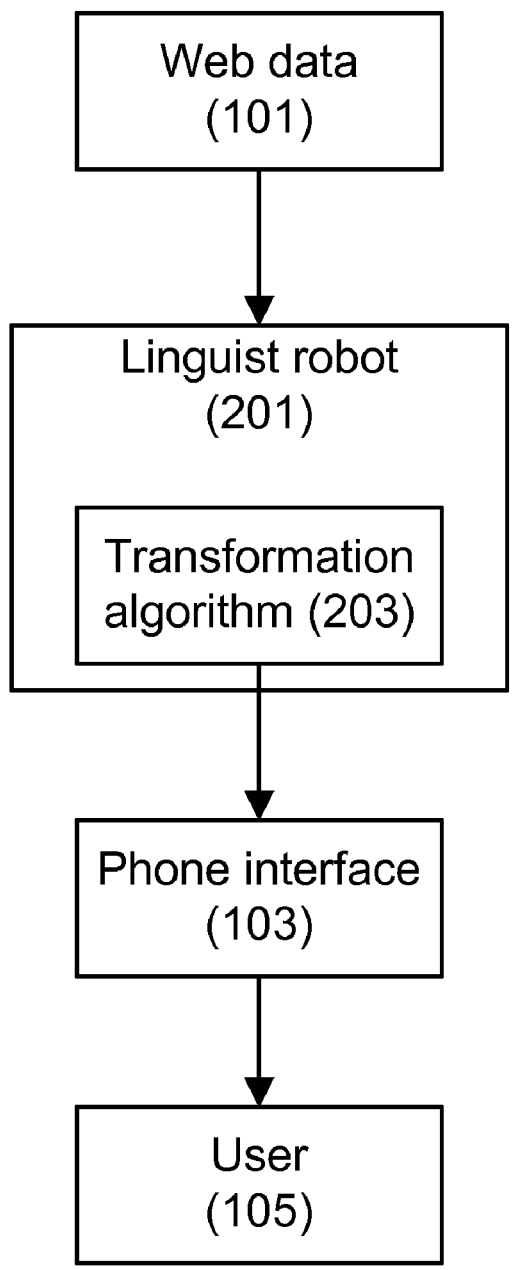
FIG. 2 is a data flow diagram showing the added steps to reformat the speech acts.
Figure 3:
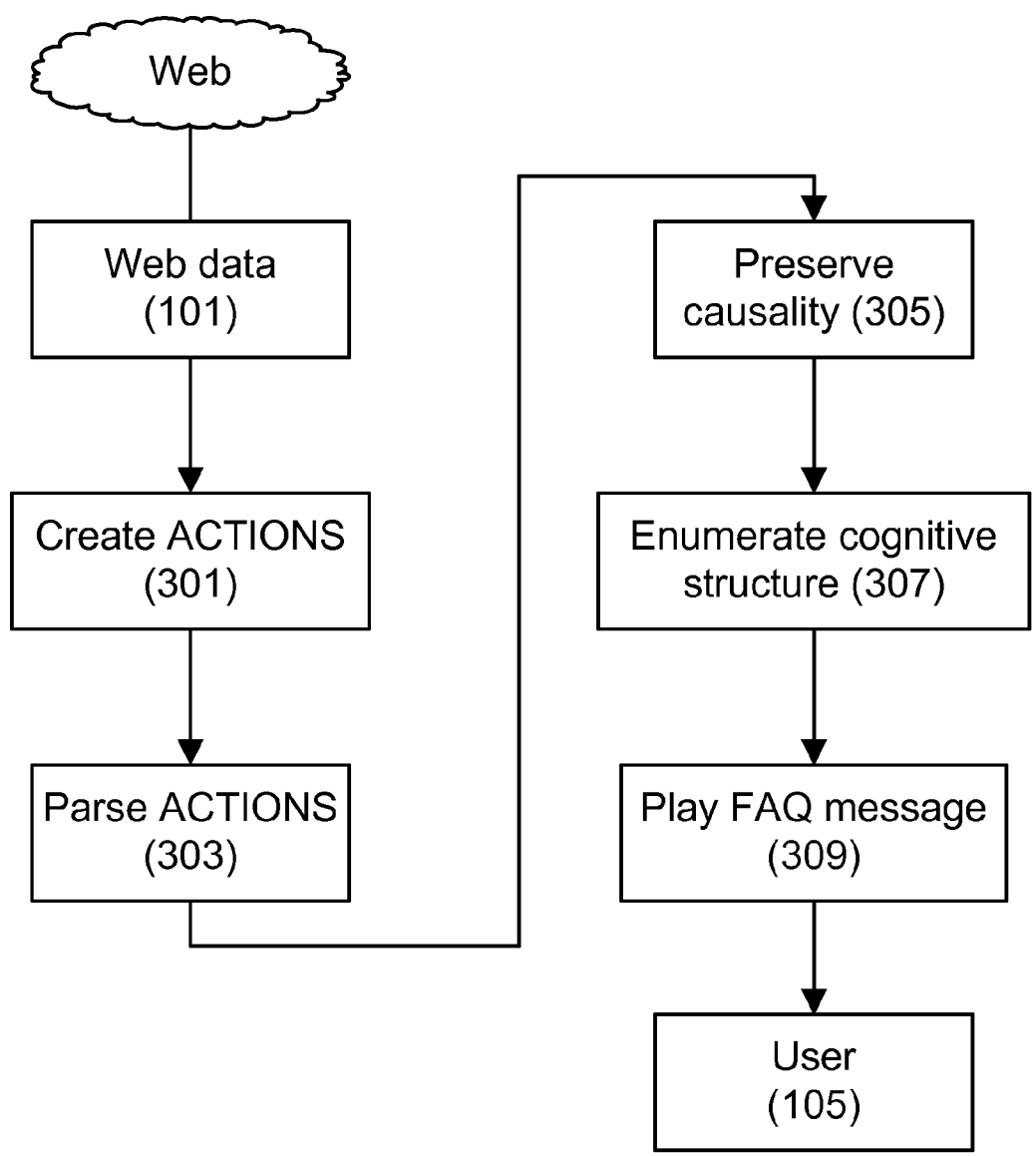
FIG. 3 provides a more detailed description of the method and the speech application.

One embodiment of this invention deals with a process of taking web data (101) and playing it back to the user (105) over the speech interface (103) as illustrated in FIGS. 1-3. The simple structure of FIG. 1 is also described in the prior art. FIGS. 2-3 are the examples of the current invention. One of the ideas is on the general process of using web data for telephone self-service via speech applications. This entails the following steps:

1. employing a web crawler script that will pull all FAQs for all problem types from a relevant web domain;
2. automatically parsing the content of the FAQ into speech acts (ACTIONS) relevant to the speech domain;
3. re-numbering the resulting ACTIONS, creating a different number of steps from the web version;
4. automatically analyzing the cumulative ACTIONS per problem type and their categorization into multiple classes that are defined by a range of steps consistent with what is allowed within short term memory limitations: simple, medium, complex, and complex-complex; and
5. playing back the eventual script based on elected class by the user or the type of the problem being addressed.

There are several examples of features in this embodiment: Unlike the current practice of presenting web data structure over the speech interface, this approach makes the data suitable to the telephone interface, in addition to making the data usable for speech self-service by streamlining the content in a manner suitable to human short term memory limitations. This is especially useful knowing as a fact that people generally have the capacity to remember 7±2 items before cognitive overload occurs to their short term memory. Furthermore, it makes the data suitable for the context of user and self service completion whether they are in front of a computer trying to fix the problem as the script is played back, or they have called just to listen to the information which will later applied in fixing the problem at a different time and location.

As an illustration of an embodiment of this invention, we describe herein one of the implementations of the process of transforming web FAQ data to speech self service data. The exemplary implementation can be outlined as follows:

1. Automatic script (web crawler) sends http request to pull data from the relevant web domain. The automatic script (web crawler) sends http request to pull data from the relevant web domain or content knowledge management database. This could also be local content stored on the computer as an unformatted FAQ database
2. ACTIONS are created from the instructions. The web content for a particular query issued by the user is sent to the transformation module where the following processes or steps will apply. The Automatic process comprises of:

Step 1: Create ACTIONS by picking out Verb or Verb Phrase (V or VP) along with its complements (noun, noun phrase, adjective phrase, or adjunct clause which is usually a sentence or adverbial phase). The content of the FAQ is automatically analyzed into speech acts (ACTIONS) relevant to the speech domain.

Step 2: Parse ACTIONS using the following procedure:

a) Parse simultaneous ACTION as single ACTION. This means that the presence of a temporal marker or similar conjunction indicates a cognitive whole event and such syntactic indices should be ignored in the computation (e.g. in situations where the text says "do X <while> doing Y." Examples of Y include result-oriented, adverbial, informative or adjectival actions).

b) Parse sequential ACTION into distinct ACTIONS (this means that the presence of a temporal marker or conjunction indicates two cognitively separable events, e.g. "do X <and> do Y" (examples of Y include consequential actions).

Step 3: When this process encounters visual or graphical content which are typically screen shots, a secondary step will be invoked to get a machine readable format such as the html or xml or Visio equivalent and then extract from these any available text which is then passed through steps 1-2.

Step 4: Preserve causality function by keeping the sequential order of the verbs that create the ACTIONS. Preserve causality through a process that matches the initial sequencing of clausal types with the resulting string and ensuring that the original verbal sequence is preserved.

Step 5: Enumerate the actions and determine cognitive status. The enumeration process invokes a simple action that counts the resulting tokens of ACTION strings. The cumulative number is processed using a cognitive algorithm that yields the following classification: simple, medium, complex, and complex-complex.

Step 6: Playback information to user according to the classification produced by the cognitive tabulation.

In one embodiment described in this patent, a method of using web data (101) for telephone self-service via a speech application (201 and 203) is presented. In one embodiment, the method comprises: a web crawler pulling scripts (301) for frequently-asked issues for all problem types from a relevant web domain. The method teaches an automatically parsing (303) of a content of the frequently-asked issues into speech acts relevant to a speech domain, by picking out verbs, verb phrases, nouns, noun phrases, adjective phrases, or adjunct clauses; reformatting the speech acts; and creating a different number of steps corresponding to the speech acts. In this embodiment process, a causality function is preserved, by keeping a sequential order of the verbs associated with the speech acts (305).

All the speech acts are analyzed corresponding to a specific problem and categorized corresponding to the specific problem into multiple numbers of classes, corresponding to different ranges of complexity of steps, based on a typical human's short-term memory limitation and recollection (307). A script of a content corresponding to the specific problem is played back (309) according to the categorized classes, problem type of the specific problem, and frequently-asked issue associated with the specific problem. Furthermore, a user interface is provided for a user (105), to enable the user control and navigate the playback.

A system, apparatus, or device comprising one of the following items is an example of the invention: voice recognizer, voice recorder, customer service site, automatic self-help module, telephone set, call management module, email server, server, client device, PDA, mobile device, cell phone, storage to store the messages, router, switches, network, communication media, cables, fiber optics, physical layer, buffer, nodes, packet switches, computer monitor, or any display device, applying the method mentioned above, for the purpose of customer service, helping users, automation, and call management.

Any variations of the above teaching are also intended to be covered by this patent application.

The invention claimed is:

1. A system of using web data for telephone self-service, said system comprising:

a web data storage comprising a plurality of web domains;

a speech application that performs the following:

pulls scripts for frequently-asked issues for all problem types from a relevant web domain selected from the plurality of web domains using a web crawler;

automatically parses a content of said frequently-asked issues into speech acts relevant to a speech domain by picking out verbs, verb phrases, nouns, noun phrases, adjective phrases, or adjunct clauses;

reformats speech acts;

creates a different number of steps corresponding to said speech acts, wherein a causality function is preserved, by keeping a sequential order of said verbs associated with said speech acts;

analyzes all said speech acts corresponding to a specific problem;

categorizes all said speech acts corresponding to said specific problem into multiple numbers of classes by counting tokens of the speech acts, corresponding to different ranges of complexity of steps, based on a typical human's short-term memory limitation and recollection, wherein the classes comprise simple, medium, complex, and complex-complex; and plays back a script of a content corresponding to said specific problem, according to said categorized classes, problem type of said specific problem, and frequently-asked issue associated with said specific problem; and a user phone interface that enables said user to control and navigate said playback.

* * * * *